United States Patent
Deulgaonkar et al.

(10) Patent No.: US 9,854,060 B2
(45) Date of Patent: Dec. 26, 2017

(54) METHODS AND SYSTEMS FOR MONITORING NETWORK STORAGE SYSTEM RESOURCES BY AN API SERVER

(71) Applicant: NETAPP, INC., Sunnyvale, CA (US)

(72) Inventors: Ameet Deulgaonkar, Bangalore (IN); Swaminathan Ramany, Cupertino, CA (US); Subhabrata Sen, Bangalore (IN)

(73) Assignee: NETAPP, INC., Sunnyvale, CA (US)

( * ) Notice: Subject to any disclaimer, the term of this patent is extended or adjusted under 35 U.S.C. 154(b) by 272 days.

(21) Appl. No.: 14/868,716

(22) Filed: Sep. 29, 2015

(65) Prior Publication Data
US 2017/0093661 A1    Mar. 30, 2017

(51) Int. Cl.
*G06F 15/173* (2006.01)
*H04L 29/08* (2006.01)
*H04L 12/26* (2006.01)
*G06F 11/30* (2006.01)

(52) U.S. Cl.
CPC .............. *H04L 67/32* (2013.01); *G06F 11/30* (2013.01); *H04L 43/0817* (2013.01); *H04L 67/10* (2013.01); *H04L 67/1097* (2013.01); *H04L 67/22* (2013.01); *H04L 67/2833* (2013.01); *H04L 67/322* (2013.01)

(58) Field of Classification Search
CPC ..... H04L 43/08; H04L 67/1097; H04L 67/32; H04L 67/2833
See application file for complete search history.

(56) References Cited

U.S. PATENT DOCUMENTS

| | | | |
|---|---|---|---|
| 7,870,300 B2 | 1/2011 | Helman et al. | |
| 8,429,097 B1 | 4/2013 | Sivasubramanian et al. | |
| 2004/0233910 A1 | 11/2004 | Chen et al. | |
| 2006/0004820 A1 | 1/2006 | Claudatos et al. | |
| 2006/0004868 A1 | 1/2006 | Claudatos et al. | |
| 2008/0201417 A1 | 8/2008 | McCain et al. | |
| 2009/0216778 A1 | 8/2009 | Szyperski et al. | |
| 2010/0250748 A1* | 9/2010 | Sivasubraman | G06F 9/5016 709/226 |

(Continued)

OTHER PUBLICATIONS

Non-Final Office Action on co-pending U.S. Appl. No. 14/881,427 dated Jul. 14, 2017.

(Continued)

*Primary Examiner* — Yves Dalencourt
(74) *Attorney, Agent, or Firm* — Klein, O'Neill & Singh, LLP

(57) ABSTRACT

Methods and systems for a networked storage environment are provided. As an example, one method includes registering a resource model with an application programming interface (API) server, where the resource model includes information regarding a plurality of resources used for storing data in a networked storage system having a plurality of storage devices; executing a data source service by the API server for obtaining information regarding any of the plurality of resources of the networked storage system, where the data source service obtains information from different data sources associated with different storage system platform types; and in response to a request, providing information regarding any metrics that are used for monitoring the plurality of resources by the API server.

21 Claims, 12 Drawing Sheets

(56) References Cited

U.S. PATENT DOCUMENTS

2016/0162189 A1    6/2016    Malwankar

OTHER PUBLICATIONS

Notice of Allowance on co-pending U.S. Appl. No. 14/881,427 dated Sep. 13, 2017.
Notice of Allowance on co-pending U.S. Appl. No. 14/814,877 dated Oct. 5, 2017.
Non-Final Office Action on co-pending U.S. Appl. No. 14/814,877 dated Aug. 25, 2017.

\* cited by examiner

METHODS AND SYSTEMS FOR MONITORING NETWORK STORAGE SYSTEM RESOURCES BY AN API SERVER

TECHNICAL FIELD

The present disclosure relates to networked storage environments, and more particularly, to monitoring resources of networked storage environments.

BACKGROUND

Various forms of storage systems are used today. These forms include network attached storage (NAS) systems, storage area networks (SANs), and others. Network storage environments are commonly used for a variety of purposes, such as providing multiple clients with access to shared data, backing up data and others.

Networked storage environments use a plurality of resources for storing and managing data for clients. Different vendors may provide different resource types and devices for storing and managing data. Continuous efforts are being made to efficiently monitor resources in networked storage environments.

BRIEF DESCRIPTION OF THE DRAWINGS

The various features of the present disclosure will now be described with reference to the drawings of the various aspects disclosed herein. In the drawings, the same components may have the same reference numerals. The illustrated aspects are intended to illustrate, but not to limit the present disclosure. The drawings include the following Figures.

DETAILED DESCRIPTION

As a preliminary note, the terms "component", "module", "system," and the like as used herein are intended to refer to a computer-related entity, either software-executing general purpose processor, hardware, firmware and a combination thereof. For example, a component may be, but is not limited to being, a process running on a hardware processor, a hardware processor, an object, an executable, a thread of execution, a program, and/or a computer.

By way of illustration, both an application running on a server and the server can be a component. One or more components may reside within a process and/or thread of execution, and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

Computer executable components can be stored, for example, at non-transitory, computer readable media including, but not limited to, an ASIC (application specific integrated circuit), CD (compact disc), DVD (digital video disk), ROM (read only memory), floppy disk, hard disk, EEPROM (electrically erasable programmable read only memory), memory stick or any other storage device, in accordance with the claimed subject matter.

In one aspect, methods and systems for a networked storage environment are provided. As an example, one method includes registering a resource model with an application programming interface (API) server, where the resource model includes information regarding a plurality of resources used for storing data in a networked storage system having a plurality of storage devices; executing a data source service by the API server for obtaining information regarding any of the plurality of resources of the networked storage system, where the data source service obtains information from different data sources associated with different storage system platform types; and in response to a request, providing information regarding any metrics that are used for monitoring the plurality of resources by the API server.

Figure 1A:
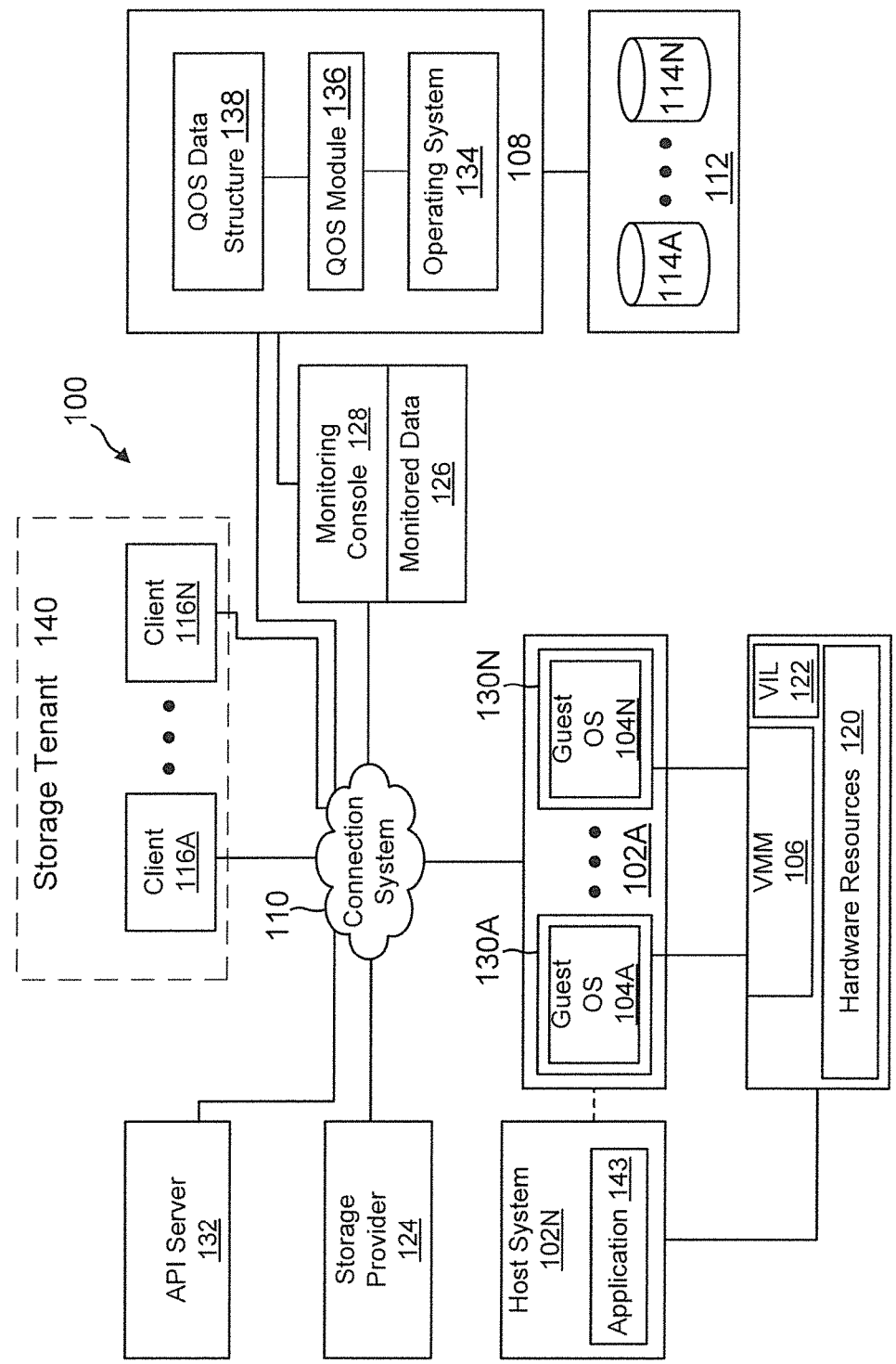
FIG. 1A shows an example of an operating environment for the various aspects disclosed herein.

System 100: FIG. 1A shows an example of a system 100, where the adaptive aspects disclosed herein may be implemented. In one aspect, system 100 may include an application programming interface (API) server 132 and a plurality of computing devices 102A-102N (may also be referred to individually as a host platform/system 102 or simply as server 102) communicably coupled to a storage system 108 executing a storage operating system 134 via a connection system 110 such as a local area network (LAN), wide area network (WAN), the Internet and others. As described herein, the term "communicably coupled" may refer to a direct connection, a network connection, or other connections to enable communication between devices. The API server 132 executes various modules/services for obtaining details of various resources of system 100, monitoring resource performance against specific metrics and managing events, as described below in detail.

As an example, host system 102A may execute a plurality of virtual machines (VMs) in virtual environment that is described below in detail. Host 102N may execute one or more application 143, for example, a database application, an email application and other. The VMs and applications may be used to read and write data at the storage devices of the storage system 108.

Clients 116A-116N (may be referred to as client (or user) 116) are computing devices that can access storage space at the storage system 108. A client can be the entire system of a company, a department, a project unit or any other entity. Each client is uniquely identified and optionally, may be a part of a logical structure called a storage tenant 140. The storage tenant 140 represents a set of users (may be referred to as storage consumers) for a storage provider 124 (may also be referred to as a cloud manager, where cloud computing is being utilized). Where the storage provider 124 is being used, the client accesses storage and protection levels through the storage provider. For example, the storage provider 124 may set limits to storage space, throughput and latency for a client. It is noteworthy that the adaptive aspects of the present disclosure are not limited to using a storage provider or a storage tenant.

In one aspect, storage system 108 has access to a set of mass storage devices 114A-114N (may be referred to as storage devices 114) within at least one storage subsystem 112. The mass storage devices 114 may include writable storage device media such as magnetic disks, video tape, optical, DVD, magnetic tape, non-volatile memory devices for example, solid state drives (SSDs) including self-encrypting drives, flash memory devices and any other similar media adapted to store information. The storage devices 114 may be organized as one or more groups of Redundant Array of Independent (or Inexpensive) Disks (RAID). The various aspects disclosed are not limited to any particular storage device type or storage device configuration.

In one aspect, the storage system 108 provides a set of logical storage volumes (or logical unit numbers (LUNs)) that presents storage space to the host systems, the storage provider 124, clients and VMs for storing information. Each volume may be configured to store data files (or data containers or data objects), scripts, word processing documents, executable programs, and any other type of structured or unstructured data. From the perspective of one of the client systems, each volume can appear to be a single drive. However, each volume can represent storage space in at one storage device, an aggregate of some or all of the storage space in multiple storage devices, a RAID group, or any other suitable set of storage space.

The storage operating system 134 organizes storage space at storage devices 114 as one or more "aggregate", where each aggregate is identified by a unique identifier and a location. Within each aggregate, one or more storage volumes are created whose size can be varied. A qtree, sub-volume unit may also be created within the storage volumes. As a special case, a qtree may be an entire storage volume.

The storage system 108 may be used to store and manage information at storage devices 114 based on a request. The request may be based on file-based access protocols, for example, the Common Internet File System (CIFS) protocol or Network File System (NFS) protocol, over the Transmission Control Protocol/Internet Protocol (TCP/IP). Alternatively, the request may use block-based access protocols, for example, the Small Computer Systems Interface (SCSI) protocol encapsulated over TCP (iSCSI) and SCSI encapsulated over Fibre Channel (FCP).

In a typical mode of operation, one or more input/output (I/O) commands, such as a CFS or NFS request, are sent over connection system 110 to the storage system 108. Storage system 108 receives the request, issues one or more I/O commands to storage devices 114 to read or write the data and issues a CIFS or NFS response containing the requested data over the network 110 to the requesting system.

Although storage system 108 is shown as a stand-alone system, i.e. a non-cluster based system, in another aspect, storage system 108 may have a distributed architecture; for example, a cluster based system that is described below in detail with respect to FIG. 2.

System 100 may include a monitoring console 128 that interfaces with the storage operating system 134 for sending and receiving performance data that may also be referred to as quality of service (QOS) data. QOS at the storage system level may be implemented by a QOS module 136 that maintains one or more QOS data structure (or performance data structure) 138. QOS module 136 is used to implement a guaranteed latency and/or a throughput rate for processing input/output (I/O) requests.

The term guaranteed latency as used herein means that a VM or client is guaranteed that an I/O request will be processed within certain duration. The term guaranteed throughput as used herein means a guaranteed number of IOPS (input/output operations per second) that are processed for a client. Throughput may be expressed as an absolute value or as a percentile metric (for example, a certain percentage of the total number of requests).

QOS module 136 stores QOS data at data structure 138. The data structure 138 identifies each storage volume and the associated latency and throughput. QOS module 136 provides this information to the storage operating system 134 such that storage operating system 134 can prioritize and process I/O requests based on the latency and throughput rates associated with the storage volumes. The storage operating system 134 maintains a plurality of queues (not shown) for providing QOS for each storage volume. The monitoring console 128 obtains QOS data from storage operating system 134 and stores it at a data structure 126.

It is noteworthy that although one monitoring console is shown as an example, system 100 may have different management type applications/devices that collect different data types for the various resources of system 100.

As an example, system 100 may also include a virtual machine environment where a physical resource is time-shared among a plurality of independently operating processor executable virtual machines (VMs). Each VM may function as a self-contained platform, running its own operating system (OS) and computer executable, application software. The computer executable instructions running in a VM may be collectively referred to herein as "guest software." In addition, resources available within the VM may be referred to herein as "guest resources."

The guest software expects to operate as if it were running on a dedicated computer rather than in a VM. That is, the guest software expects to control various events and have access to hardware resources on a physical computing system (may also be referred to as a host platform) which maybe referred to herein as "host hardware resources". The host hardware resource may include one or more processors, resources resident on the processors (e.g., control registers, caches and others), memory (instructions residing in memory, e.g., descriptor tables), and other resources (e.g., input/output devices, host attached storage, network attached storage or other like storage) that reside in a physical machine or are coupled to the host platform.

Host platform 102A includes/provides a virtual machine environment executing a plurality of VMs 130A-130N that may be presented to client computing devices/systems 116A-116N. VMs 130A-130N execute a plurality of guest OS 104A-104N (may also be referred to as guest OS 104) that share hardware resources 120. Application 143 may be executed within VMs 130. As described above, hardware resources 120 may include storage, CPU, memory, I/O devices or any other hardware resource.

In one aspect, host platform 102A interfaces with a virtual machine monitor (VMM) 106, for example, a processor executed Hyper-V layer provided by Microsoft Corporation of Redmond, Wash., a hypervisor layer provided by VMWare Inc., or any other type. VMM 106 presents and manages the plurality of guest OS 104A-104N executed by the host platform 102. The VMM 106 may include or interface with a virtualization layer (VIL) 122 that provides one or more virtualized hardware resource to each OS 104A-104N.

In one aspect, VMM 106 is executed by host platform 102A with VMs 130A-130N. In another aspect, VMM 106 may be executed by an independent stand-alone computing system, referred to as a hypervisor server or VMM server and VMs 130A-130N are presented at one or more computing systems.

It is noteworthy that different vendors provide different virtualization environments, for example, VMware Corporation, Microsoft Corporation and others. Data centers may have hybrid virtualization environments/technologies, for example, Hyper-V and hypervisor based virtual environment. The generic virtualization environment described above with respect to FIG. 1A may be customized depending on the virtual environment to implement the aspects of the present disclosure. Furthermore, VMM 106 (or VIL 122) may execute other modules, for example, a storage driver, network interface and others, the details of which are not germane to the aspects described herein and hence have not been described in detail.

Figure 1B:
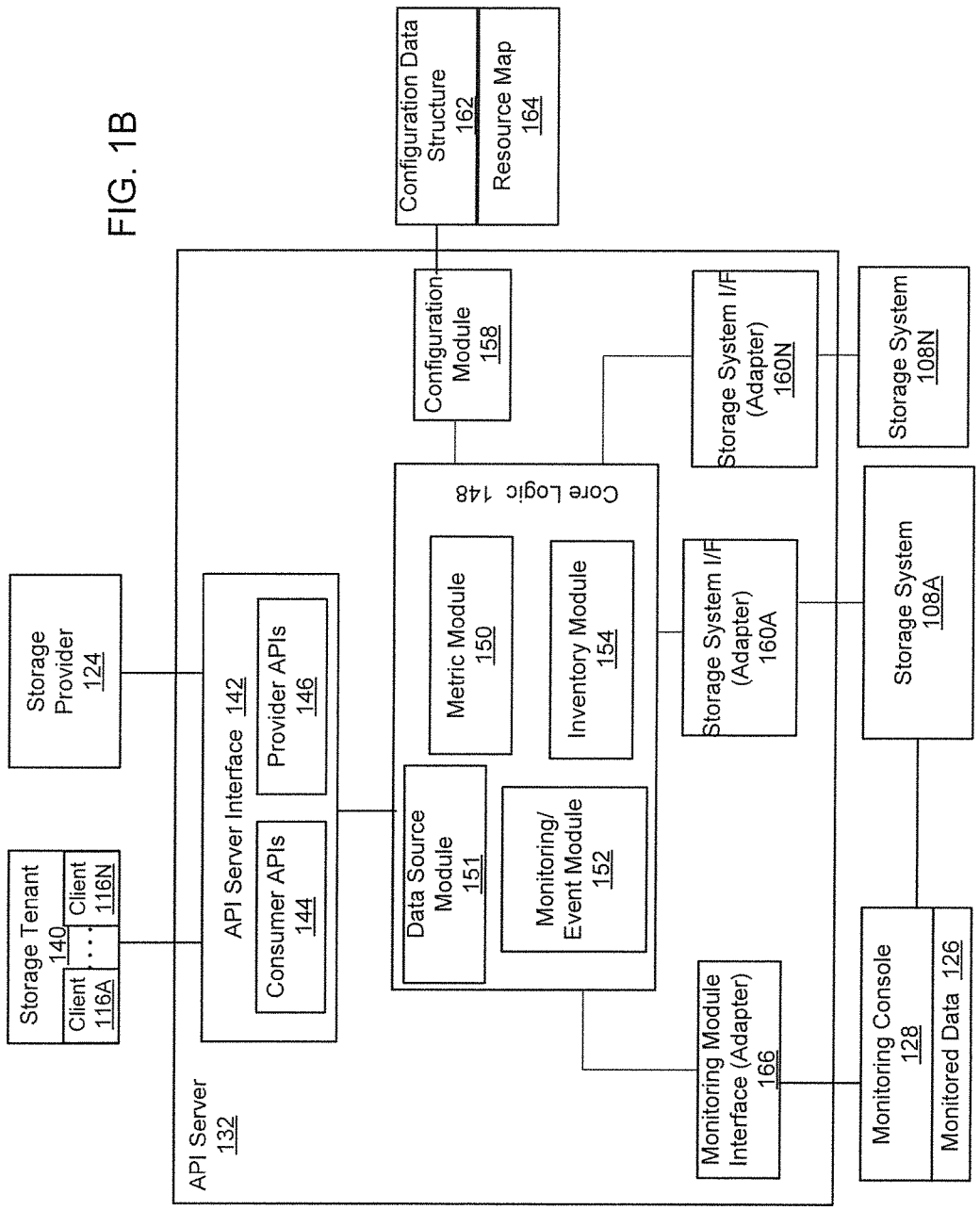
FIG. 1B shows an example of an API server used according to one aspect of the present disclosure.

API Server 132: FIG. 1B shows an example of the API server architecture, according to one aspect of the present disclosure. The API server 132 may be a stand-alone computing device or implemented as a VM. In one aspect, API server 132 may be part of another management console.

Figure 3A:
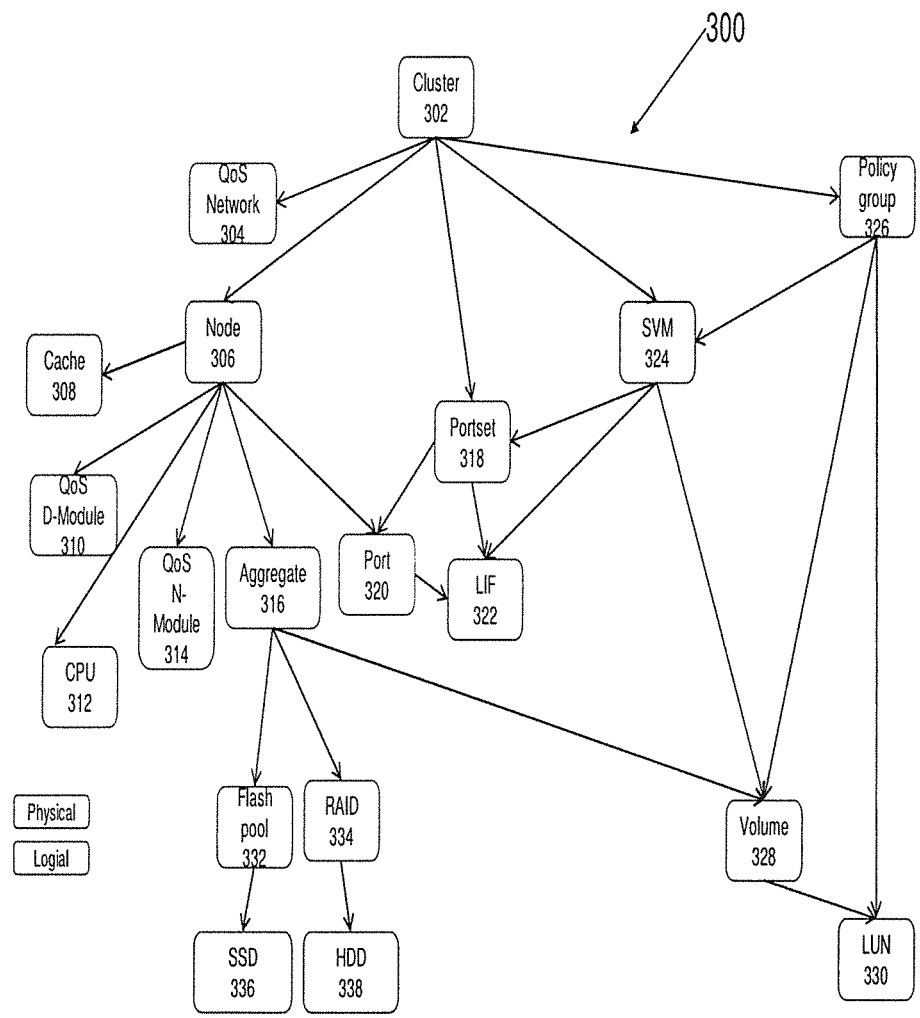
FIG. 3A shows a resource model, created and used according to one aspect of the present disclosure.
Figure 3B:
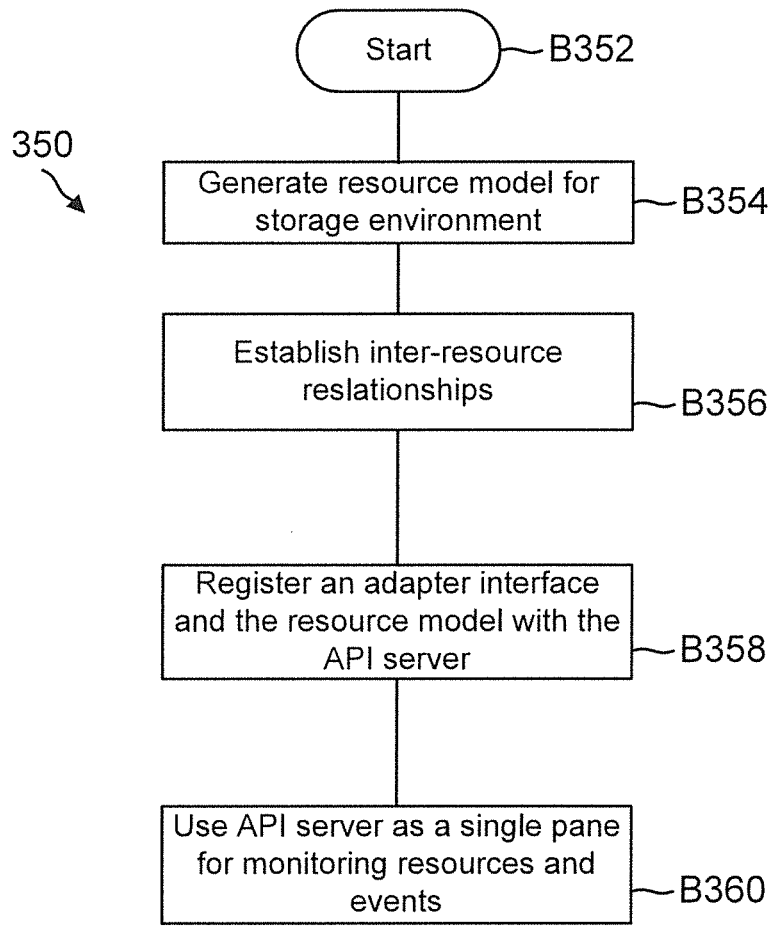
FIG. 3B shows a process flow for generating a resource model, according to one aspect.

The API server 132 include an API server interface 142 that provides consumer APIs 144 and provider APIs 146. The provider APIs are used by the storage provider 124, while the consumer APIs are used by the storage tenant 140 for sending requests. It is noteworthy that APIs 144 and 146 may be integrated into a single API as a REST API for responding to REST API requests. REST means "Representational State Transfer". REST is a scalable system used for building web services. REST systems/interface may use HTTP (hyper-text transfer protocol) or other protocols for communicating. When implemented as a REST API, the API server interface 142 receives a request and provides a response to the request. An example/structure for implementing the REST API to respond to user requests is shown in FIG. 3E and described below in detail. It is noteworthy that the adaptive aspects described herein are not limited to REST based APIs or any specific API format.

In one aspect, the API server 132 includes core logic 148 implemented using hardware based processing logic, computer instructions and a combination thereof. Core logic 148 may also be implemented as an API and an example/structure for implementing the core logic API is shown in FIG. 3D and described below in detail.

Core logic 148 interfaces with or includes a configuration module/service 158 that stores configuration data at data structure 162. The configuration module 158 may also be implemented as an API. The configuration data may be used to store configuration information regarding different users and data sources. The term data source as used herein includes a storage system (for example, 108, 202 (FIG. 2)), a computing device (for example, monitoring console 128) and other resources that are used in a networked storage environment for providing storage services. Data structure 162 may also store information regarding which drivers/adapters are to be used for interacting with a particular data source, as described below in detail.

Core logic 148 executes an inventory module (or service) 154 that is used to obtain a list and details of various resources of a networked storage environment. An example of the inventory service is shown as 374A, FIG. 3D and described below in detail. The inventory module 154 may communicate with storage systems 108A-108N via the storage system interface (or adapters) 160A-160N (may be referred to as adapter 160). Adapter 160 may also be implemented as an API, an example of which is shown in FIG. 3F, described below in detail. In one aspect, different adapters' 160A-160N may be executed for interfacing with different storage system platforms (shown as 108A-108N). For example, a first adapter type may be used to interface with a FAS series storage controller provided by NetApp Inc, the assignee of this application, while a second adapter type may be provided for an E series storage controller, also provided by NetApp Inc. The storage system platforms may be provided by different vendors and may use different storage devices/technologies.

Information regarding the resources of a storage system may be stored at a data structure, for example, 162. In one aspect, in response to an API request received by API interface 142, core logic 148 collects information from different data sources, consolidates the information and provides a response to the API request.

In one aspect, core logic 148 also executes a metric module/service 150 that is used to obtain operational metrics associated with a storage resource, for example, performance metrics (latency, throughput and others), capacity and others. The metric module 150 provides access to metrics data without the user having any knowledge of the underlying mechanism that is used to monitor the metrics. An example of a structure for implementing the metrics service is shown as 374D in FIG. 3D and described below in detail.

Core logic 148 further includes a monitoring module (or event service) 152 that obtains event information from monitoring console 128 or any other module. The monitoring module 152 may use a monitoring module interface (or adapter) 166 to communicate with the monitoring console 128 that communicates with the storage system 108 and stores monitored data in a data structure 126. In one aspect, monitoring console 128 maintains various counters to track performance and utilization of storage resources. The event service may be implemented using object 374C shown in FIG. 3D and described below in detail.

The core logic 148 also executes a data source module 151 that is used to collect and manage information regarding different resources at a plurality of storage platforms and computing devices (for example, storage system 108, monitoring console 128 and others). The information includes configuration information, performance metrics, events and others. In one aspect, the data source service may be implemented using object 374B shown in FIG. 3D and described below in detail. The information from the data source itself is collected by an adapter API shown in FIG. 3F.

In one aspect, a resource map 164 is generated and registered with API server 132 for monitoring one or more resources of a storage system. The resource map 164 may be generated by the storage system that uses the resources for storing data. An example of a resource map or object model is described below with respect to FIG. 3A. In one aspect, as described below in detail, API server 142 enables a user to obtain information regarding different storage systems, monitor the resources used by the storage systems, without having to know the underlying details of the storage technology or the applications that are used for monitoring the resources.

Clustered System: FIG. 2 shows a cluster based storage environment 200 having a plurality of nodes within cluster 202 that store data on behalf of clients. System 200 also includes the API server 132, the storage provider 124, the storage tenant 140 and the monitoring console 128 that have been described above in detail. It is noteworthy that system 200 may also have other management consoles/devices for performing different functions. API server 132 uses custom adapters for obtaining information from the other consoles.

Storage environment 200 may include a plurality of client systems 204.1-204.N (similar to 116) as part of or associated with storage tenant 140, a clustered storage system 202 (similar to storage system 108) and at least a network 206 communicably connecting the client systems 204.1-204.N, the API server 132, the storage provider 124 and the clustered storage system 202. It is noteworthy that these components may interface with each other using more than one network having more than one network device.

The clustered storage system 202 includes a plurality of nodes 208.1-208.3, a cluster switching fabric 210, and a plurality of mass storage devices 212.1-212.3 (may be referred to as 212 and similar to storage device 114). Each of the plurality of nodes 208.1-208.3 is configured to include a network module, a storage module, and a management module, each of which can be implemented as a processor executable module. Specifically, node 208.1 includes a network module 214.1, a storage module 216.1, and a management module 218.1, node 208.2 includes a network module 214.2, a storage module 216.2, and a management module 218.2, and node 208.3 includes a network module 214.3, a storage module 216.3, and a management module 218.3.

The network modules 214.1-214.3 include functionality that enable the respective nodes 208.1-208.3 to connect to one or more of the client systems 204.1-204.N (or the API server 132, storage provider 124 and the monitoring console 128) over the computer network 206. The network modules handle file network protocol processing (for example, CFS, NFS and/or iSCSI requests). The storage modules 216.1-216.3 connect to one or more of the storage devices 212.1-212.3 and process I/O requests. Accordingly, each of the plurality of nodes 208.1-208.3 in the clustered storage server arrangement provides the functionality of a storage server.

The management modules 218.1-218.3 provide management functions for the clustered storage system 202. The management modules 218.1-218.3 collect storage information regarding storage devices 212 and makes it available to monitoring console 128. The management modules may also be used to configure QOS values (e.g. latency and throughput) for storage volumes that are managed by a node.

A switched virtualization layer including a plurality of virtual interfaces (VIFs) 219 is provided to interface between the respective network modules 214.1-214.3 and the client systems 204.1-204.N, allowing storage 212.1-212.3 associated with the nodes 208.1-208.3 to be presented to the client systems 204.1-204.N as a single shared storage pool.

The clustered storage system 202 can be organized into any suitable number of storage virtual machines (SVMs) (may be referred to as virtual servers (may also be referred to as "SVMs"), in which each SVM represents a single storage system namespace with separate network access. Each SVM has a client domain and a security domain that are separate from the client and security domains of other SVMs. Moreover, each SVM is associated with one or more VIFs 219 and can span one or more physical nodes, each of which can hold one or more VIFs and storage associated with one or more SVMs. Client systems can access the data on a SVM from any node of the clustered system, through the VIFs associated with that SVM.

Each of the nodes 208.1-208.3 is defined as a computing system to provide application services to one or more of the client systems 204.1-204.N. The nodes 208.1-208.3 are interconnected by the switching fabric 210, which, for example, may be embodied as a Gigabit Ethernet switch or any other type of switching/connecting device.

Figure 2:
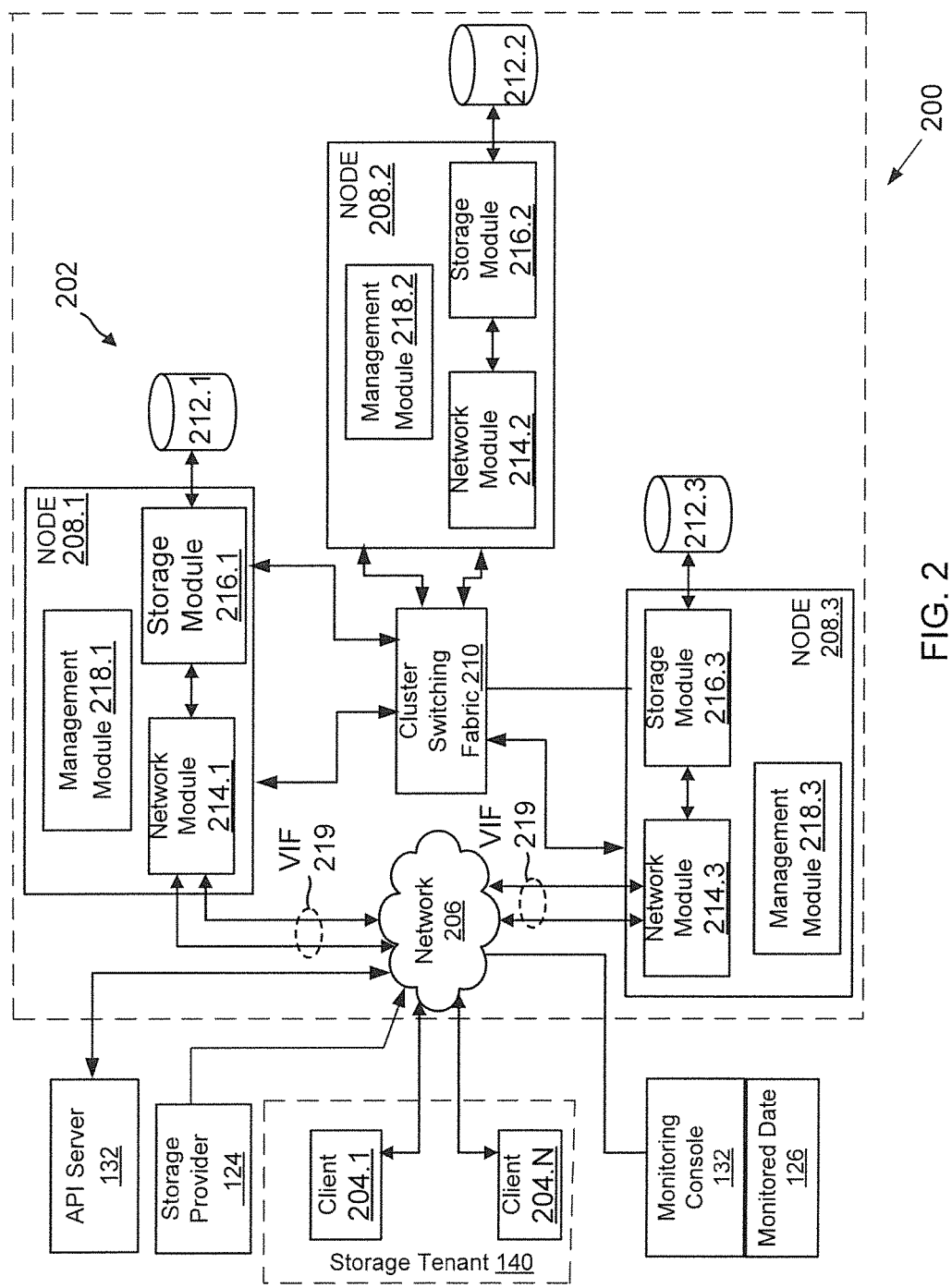
FIG. 2 shows an example of a clustered storage system, used according to one aspect of the present disclosure.

Although FIG. 2 depicts an equal number (i.e., 3) of the network modules 214.1-214.3, the storage modules 216.1-216.3, and the management modules 218.1-218.3, any other suitable number of network modules, storage modules, and management modules may be provided. There may also be different numbers of network modules, storage modules, and/or management modules within the clustered storage system 202. For example, in alternative aspects, the clustered storage system 202 may include a plurality of network modules and a plurality of storage modules interconnected in a configuration that does not reflect a one-to-one correspondence between the network modules and storage modules. In another aspect, the clustered storage system 202 may only include one network module and storage module.

Each client system 204.1-204.N may request the services of one of the respective nodes 208.1, 208.2, 208.3, and that node may return the results of the services requested by the client system by exchanging packets over the computer network 206, which may be wire-based, optical fiber, wireless, or any other suitable combination thereof.

Resource Map: FIG. 3A shows an example of a structure of a resource map 300 that is stored at data structure 162 for tracking information regarding different resources that are used within a clustered storage system (for example, 202, FIG. 2). Each resource is identified by a unique resource identifier value (or resource key). It is noteworthy that the resource map varies based on the storage system type and/or the vendor that provides the hardware/software for the storage system. Therefore, API server 132 may store multiple resource maps with appropriate adapters to obtain information regarding the various resources.

In one aspect, the resource model 300 uses various relationship types. For example, a resource object "B" is in a "composition" relationship with a resource object "A" when B cannot exist independently and a change of status in A also affects the status of B. An example of a composition relationship is a cluster having a plurality of SVMs.

A resource object A is said to be in an "aggregation" relationship with resource B when A is composed of various resource object B's but B is also able to exist independently. An example of this relationship type is a storage pool that includes various storage devices but the storage devices can also exist themselves.

Objects A and B have an "association" relationship when both A and B have independent existence but use each other for a service, for example, a LUN and an iGroup (initiator group) having a plurality of initiators.

In one aspect, the resource map 300 may be implemented using the "JSON" format. JSON means Javascript Object Notation that uses a text format and is platform independent. JSON is built on a collection of name/value pairs and an ordered list of variables. A JSON object is an unordered set of name/value pairs. Each object begins with a {(left brace) and ends with } (a right brace). Each name is followed by: (colon) and the name/value pairs are separated by , (comma). An array is an ordered collection of values. An array begins with [(left bracket) and ends with ] (right bracket). Values are separated by "," (comma). A value can be a string in double quotes, or a number, or true or false or null, or an object or an array. A string is a sequence of zero or more Unicode characters, wrapped in double quotes, using backslash escapes. A character is represented as a single character string.

Resource map 300 maybe hierarchical in nature where various objects may also have parent-child, peer and remote peer relationships, as described below. As an example, a cluster object 302 that may be categorized as a root object type for tracking cluster level resources. The cluster object 302 is associated with various child objects, for example, a node object 306, QOS network object 304, a portset object 318, a SVM object 324 and a policy group 326. The cluster object 302 stores information regarding the cluster, for example, the number of nodes it may have, information identifying the nodes; and any other information.

The QOS network object 304 is used to monitor network resources, for example, network switches and associated bandwidth used by a clustered storage system.

The cluster node object 306 stores information regarding a node, for example, a node identifier and other information. Each cluster node object 306 is associated with a pluralities of child objects, for example, a cache object 308, a QOS object for a storage module 310, a QOS object for a network module 314, a CPU object 312 and an aggregate object 316. The cache object 308 is used to track utilization/latency of a cache. The QOS storage module 310 tracks the QOS of a storage module defined by a QOS policy data structure. The QOS network module object 314 tracks the QOS for a network module. The CPU object 312 is used to track CPU performance and utilization of a node.

The aggregate object 316 tracks the utilization/latency of a storage aggregate that is managed by a cluster node. The aggregate object may have various child objects, for example, a flash pool object 332 that tracks usage of a plurality of flash based storage devices (shown as "flash pool"). The flash pool object 332 may have a solid state storage device (SSD) object 336 that tracks the actual usage of specific SSD based storage devices. The RAID group 334 is used to track the usage of storage devices configured as RAID devices. The RAID object 334 includes a storage device object 338 (shown as a HDD (hard disk drive) that tracks the actual utilization of the storage devices.

Each cluster is provided a portset having a plurality of ports that may be used to access cluster resources. A port includes logic and circuitry for processing information that is used for communication between different resources of the storage system. The portset object 318 tracks the various members of the portset using a port object 320 and a logical interface (LIF) object 322. The LIF object 322 includes a logical interface, for example, an IP address, while the port object 320 includes a port identifier for a port, for example, a world-wide port number (WWPN). It is noteworthy that the port object 320 is also a child object of node 306 that may use a port for network communication with clients.

A cluster may present one or more SVMs to client systems. The SVMs are tracked by the SVM object 324, which is a child object of cluster 302. Each cluster is also associated with a policy group that is tracked by a policy group object 326. The policy group 326 is associated with SVM object 324 as well as storage volumes and LUNs. The storage volume is tracked by a volume object 328 and the LUN is tracked by a LUN object 330. The volume object 328 includes an identifier identifying a volume, size of the volume, clients associated with the volume, volume type (i.e. flexible or fixed size) and other information. The LUN object 330 includes information that identifies the LUN (LUNID), size of the LUN, LUN type (read, write or read and write) and other information.

In one aspect, the resource map may also maintain relationships between the various resources as a JSON object. For example, the following shows an example of the relationship object between an aggregate and a disk:

---
AggregateDiskRelationship.json
---

```
{
"title": "AggregateDiskRelationship",
"description": "",
"type": "object",
"properties": {
"key": {
"description": " ",
"type": "string",
},
"aggregate_key": {
"description": " ",
"type": "string",
"ref": {
"name": "aggregate",
"object": "Aggregate",
"type": "association"
}
},
"disk_key": {
"description": " ",
"type": "string",
"ref": {
"name": "disk",
"object": "Disk",
"type": "association"
}
}
}
```

As shown above, the relationship type is an "association" between a disk and an aggregate.

The following shows an example of a relationship object for a LUN map and a Node object:

---
LunMapNodeRelationship.json
---

```
{
"title": "LunMapNodeRelationship",
"description": "",
"type": "object",
"properties": {
"key": {
"description": " ",
"type": "string"
},
"lunmap_key": {
"description": " ",
"type": "string",
"ref": {
"name": "lunmap",
"object": "LunMap",
"type": "association"
}
},
"node_key": {
"description": " ",
"type": "string",
"ref": {
"name": "node",
"object": "Node",
"type": "association"
}
}
}
```

The following shows an example of a storage VM and aggregate relationship object.

---
StorageVMAggregateRelationship.json
---

```
{
"title": "StorageVMAggregateRelationship",
"description": "",
"type": "object",
"properties": {
"key": {
"description": " ",
"type": "string"
},
"storage_vm_key": {
"description": " ",
"type": "string",
"ref": {
"name": "storagevm",
"object": "StorageVM",
"type": "association"
}
},
"aggregate_key": {
"description": " ",
"type": "string",
"ref": {
"name": "aggregate",
"object": "Aggregate",
"type": "association"
}
}
}
```

It is noteworthy that the foregoing objects are shown as an example and other formats may be used to store resource and relationship information.

Process Flows: FIG. 3B shows a process 350 for generating and using a resource model by the API server 132, according to one aspect of the present disclosure. The process begins in block B352. A processor executable application executes the processes of FIG. 3B for a storage platform/environment. In block B354, a resource model 164 (or map) is generated for a storage environment. For example, for a clustered storage environment, a resource model of FIG. 3A is generated. Relationships between the various objects is established in block B356. The relationship may be a composition, aggregation or association type, as described above in detail. Once the resource model and the relationships are created, an adapter (for example, 160) is registered with the API server 132 for collecting information regarding the various resources.

In block B360, the API server 132 is then used as a single pane to monitor the performance of different resources and any events that may be associated with the resources. In one aspect, a monitoring object for one or more resource is created. The parameters that need to be monitored (for example, latency, throughput, utilization, remaining useful capacity of a resource at any given time and any other parameter) may be specified in the object itself. In one aspect, a metric object is defined by the API server 132. In one aspect, events are also monitored by defining event based objects. An example of an event JSON object is provided below:

```
{
"title": "Event",
"description": "Captures a condition associated with a resource managed by API Server." ,
"type": "object",
"properties": {
"key": {
"description": "Unique Identifier for the event.",
"type": "string"
},
"severity": {
"description": "Severity of the event.",
"enum": [normal, information, warning, error, critical]
},
"source_resource_key": {
"description": "Identifier of the resource on which the event is raised.",
"type": "string"
},
"status": {
"description": "Status of the event.",
"type": "string"
},
"created_timestamp": {
"description": "Time at which the event was generated. "
"Value is seconds since 1/1/1970 in UTC",
"type": "number"
},
"type": {
"description": "Type or class to which the event belongs to.",
"type": "string"
}
}
```

Figure 3C:
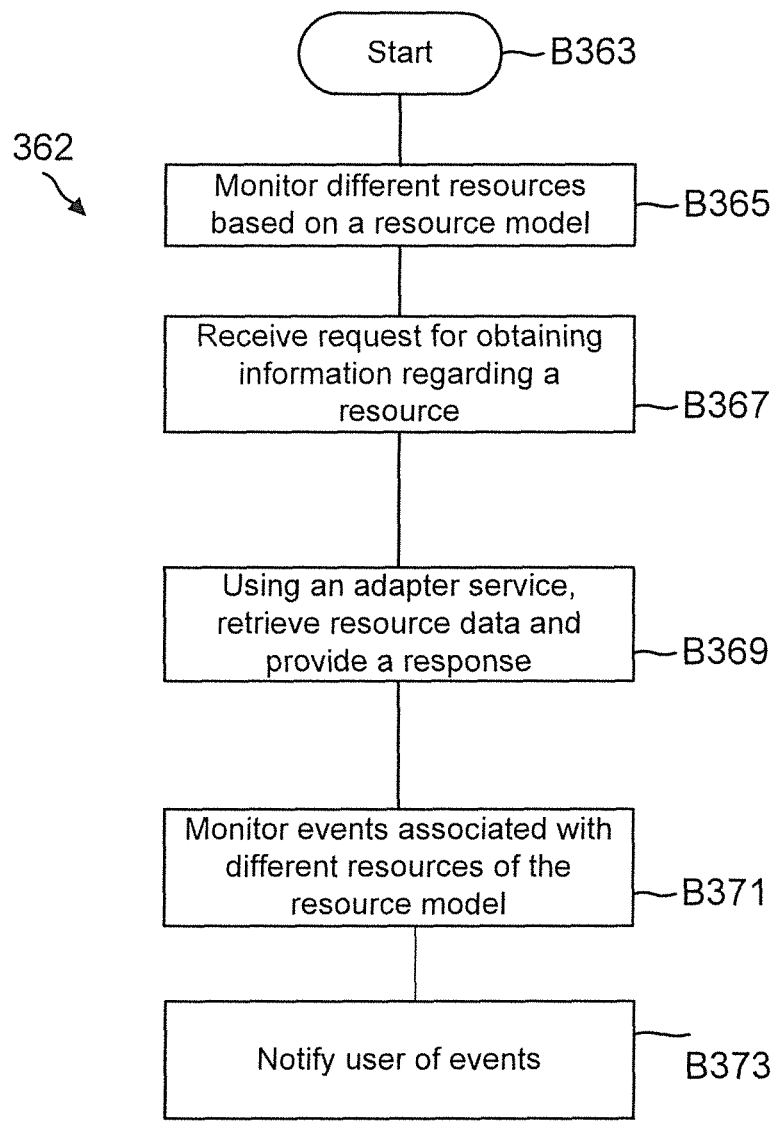
FIG. 3C shows a process for using the API server for monitoring resources, according to one aspect of the present disclosure.
Figure 3D:
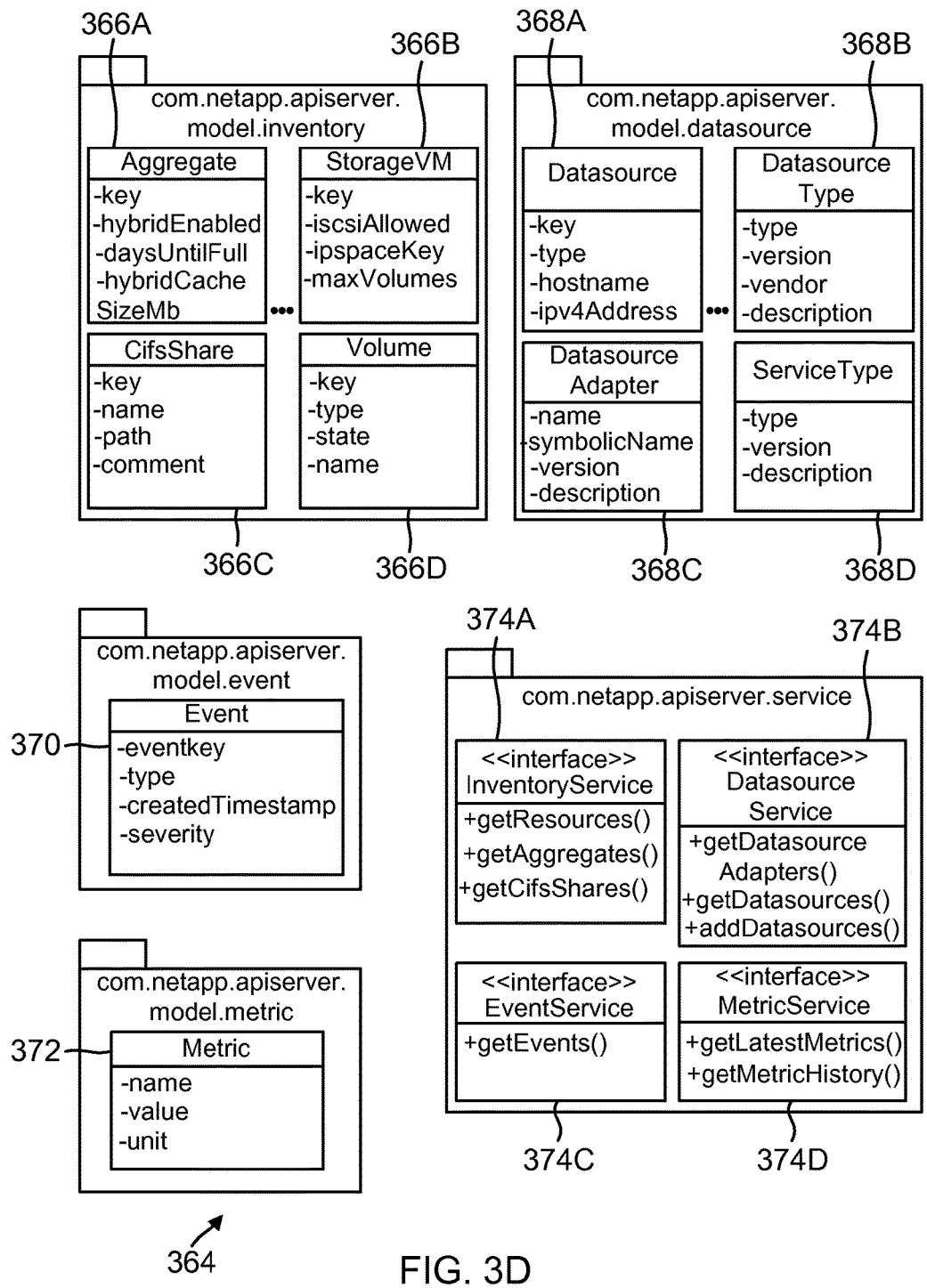
FIG. 3D shows an example of a class diagram used by the core API server logic, according to one aspect of the present disclosure.
Figure 3E:
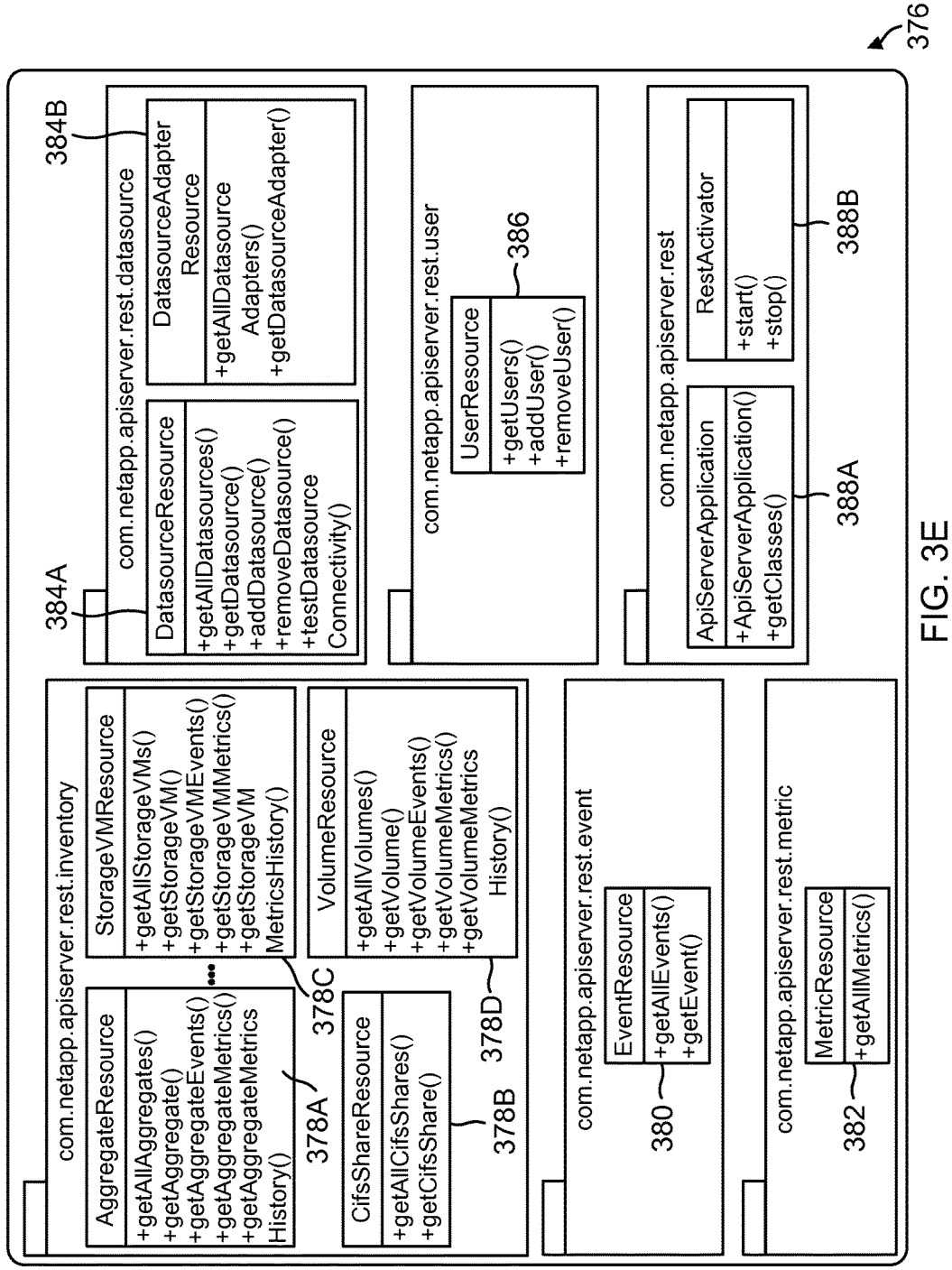
FIG. 3E shows an example of a class diagram used by a REST API, according to one aspect of the present disclosure.
Figure 3F:
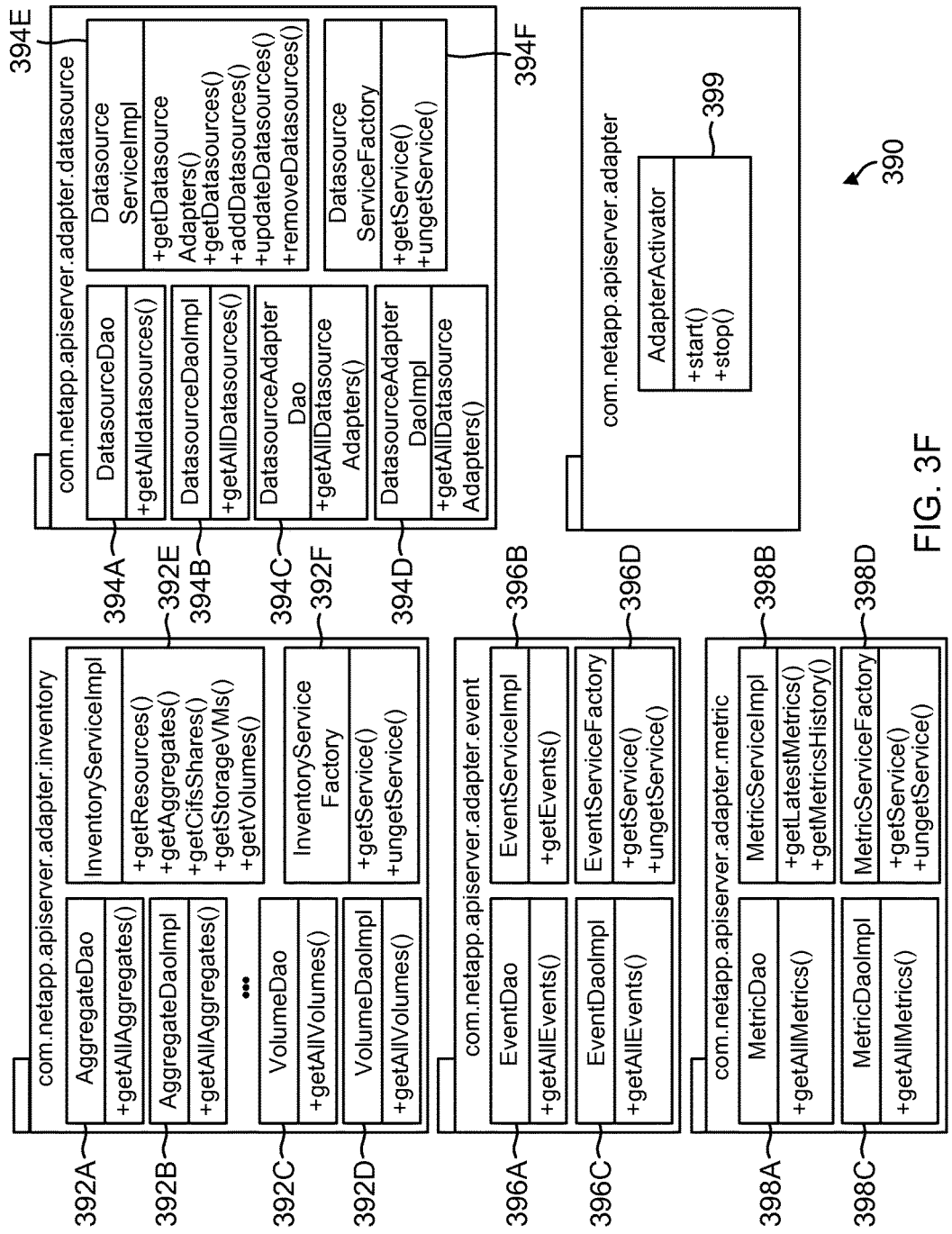
FIG. 3F shows an example of a class diagram used by a data source adapter, according to one aspect of the present disclosure.

FIG. 3C shows a process 362 for monitoring the various resources of a storage environment and then providing information regarding the resources in response to an API request, according to one aspect of the present disclosure. The process begins in block B363, when a resource model and an associated adapter has been registered with the API server 132, as described above in FIG. 3B. Different resource models and adapters are used for different platforms in a heterogonous environment using a plurality of storage system types.

In one aspect, in block B365, the resources of a storage environment are monitored by the API server 132. The resources are monitored for metrics and events. Different attributes of a resource may be monitored. In one aspect, the attributes may be customized for a specific environment. For example, latency, throughput, device utilization, node utilization, CPU utilization and other features of various resources may be monitored.

In block B367, a request is received by the API server 132 for information regarding a resource. The request for information may be received by the API server interface 142, implemented as an API. In block B369, the API server 132 initiates an adapter service to retrieve the requested data. The adapter service will depend on the data source type. The adapter information is retrieved from the configuration data structure 162. The following provides an example of a request/response for obtaining the last samples collected for average read and write latency for a storage volume. The resource below is identified by a resource key. Adapter 166 may be used to obtain the information from the monitoring console 128/

---

```
GET /storage/ontap/flexvols/5dc4e260-8175-11e3-a283-
123478563412:type=volume,uuid=0b73a654-abff-41ff-ace6-
962fb08caf13/metrics?name=read_latency&name=write_latency
Response
HTTP/1.1
Accept: application/json
Accept-Lanugage: en-us
HTTP 200 OK
Content-Type: application/json
Content-Length: <length>
```

-continued

```
{
"status": {
"code": "success"
},
"result": {
"total_records": 1,
"records": [
{
"resource_key": "5dc4e260-8175-11e3-a283-
123478563412:type=volume,uuid=0b73a654-abff-41ff-ace6-
962fb08caf13",
"metrics": [
{
"name": "read_latency",
"unit": "usecs"
"samples": [
{
"timestamp": "1409643301199"
"value": 22.454546,
}
]
},
{
"name": "write_latency",
"unit": "usecs"
"samples": [
{
"timestamp": "1409643301199"
"value": 32.454546,
}
```

In one aspect, in block B371, various events associated with the resources are also monitored. The events may be monitored by the monitoring console 128 and the information for the events is provided to the API server 132 via adapter 166. An example of an event object to monitor events is provided above. In block B373, the user is notified of the event. The user may take an appropriate action based on the event type.

FIGS. 3D-3F show examples of various structures that are used to implement the functionality of API server 132 and its modules, including adapters 160 and 166. These structures are used to implement the processes of FIGS. 3B and 3C, described above in detail.

FIG. 3D shows an example of a structure 364 for implementing core logic 148 as a core API. The structure also includes components of the storage model that is exposed by the API server 132, according to one aspect. The structure includes various resource objects, for example, an aggregate object 366A that is identified by a key value, indicates if the aggregate has both hard drives and SSDs ("hybrid enabled"), a hybrid cache size and a duration before the aggregate will be full. The storage VM object 366B is identified by a unique key, indicates if iSCSI is enabled, an IP address space and a maximum number of volumes that can be supported by the SVM.

A CIFS share 366C is identified by a key, name, path and any specific comments. A CIFS share is a logical object used for storing data using the CIFS protocol. A volume object 366D is identified by a key, indicates the volume type, a volume state (i.e. whether it is online or offline) and a volume name.

The structure 364 also includes different services 374A-374D that are implemented by the core API, according to one aspect. The inventory service 374A obtains information regarding different resources, aggregates, CIFS shares and others. The event service 374C obtains information regarding events, for example, from monitoring console 128. Event object 370 may be used to store information including an event key that identifies the event, the event type, when the event occurred and the severity of the event.

The metric service 374D is used to obtain the latest metrics and the metric history. As used above, the metrics are used for monitoring different performance parameters, for example, latency, throughput and other parameters. The metrics are maintained using object 372 that identifies the metric by a name, value and unit. The metric service interfaces with the appropriate adapter for obtaining requested information.

The data source service 374B is used to manage the various data sources at API server 132. Since different platforms have different adapters, the data source service 374B is used to get information regarding an adapter, data source or to add a new data source.

The data source model is shown as objects 368A-368D. Object 368A identifies a data source by a key, type, a host name and an IP4 address. The data source type object 368B identifies the data source type, version, the vendor that provides the data source and a description. To collect data from the data source, the data source adapter object 368C identifies the adapter, name, a version and provides a brief description of the adapter. The service type object 368D for the data source stores information regarding the service provided by the data source, version and description.

FIG. 3E shows an example of a REST API structure 376 that is used to apply filters for lookup operations and making calls to the core logic 148 APIs for different services that are described above with respect to FIG. 3D. The objects 378A-378D, 380, 382 and 384A-384B are self-explanatory. Object 386 is used to obtain user information, while object 388A is to obtain classes. Object 388B is used to start or stop a REST API.

FIG. 3F shows an example of a structure 390 for implementing an adapter for providing certain services on behalf of the core logic 148 APIs. As mentioned above adapters are used to obtain data from different data sources and the adapters use data access object interfaces (shown as Dao) and Dao implementation patterns (DaoImpl) for obtaining information from different storage platforms. A DAO is an object that provides an abstract interface to a database or other persistence mechanisms. By mapping application calls a storage persistence layer, DAO enables specific operations without exposing details of the database.

For example, object 392A is for an aggregate Dao, while object 392B is for an aggregate Dao implementation pattern. For volumes, objects 392C and 392D are used to obtain volume information. Inventory service implementation pattern is shown as object 392E, while object 392F is used to handle concurrent inventory requests.

For managing data sources, the adapter uses objects 394A-394E. Data source service is implemented by object 394E and the factory object 394F manages concurrent requests.

Event information is obtained using objects 396A-396D. The metric information is obtained using objects 398A-398D. These objects and their functionality is self-explanatory. The adapter itself can be activated by using object 399.

In one aspect, the structure and layout described above, enables a user to use different storage systems/platforms, configure adapters for different data sources, obtain and monitor the resources operating at different data sources. The user does not have to know the details of the underlying storage platforms to accomplish these complex tasks, especially in heterogonous networked storage environments that use a plurality of disparate storage systems.

Figure 4A:
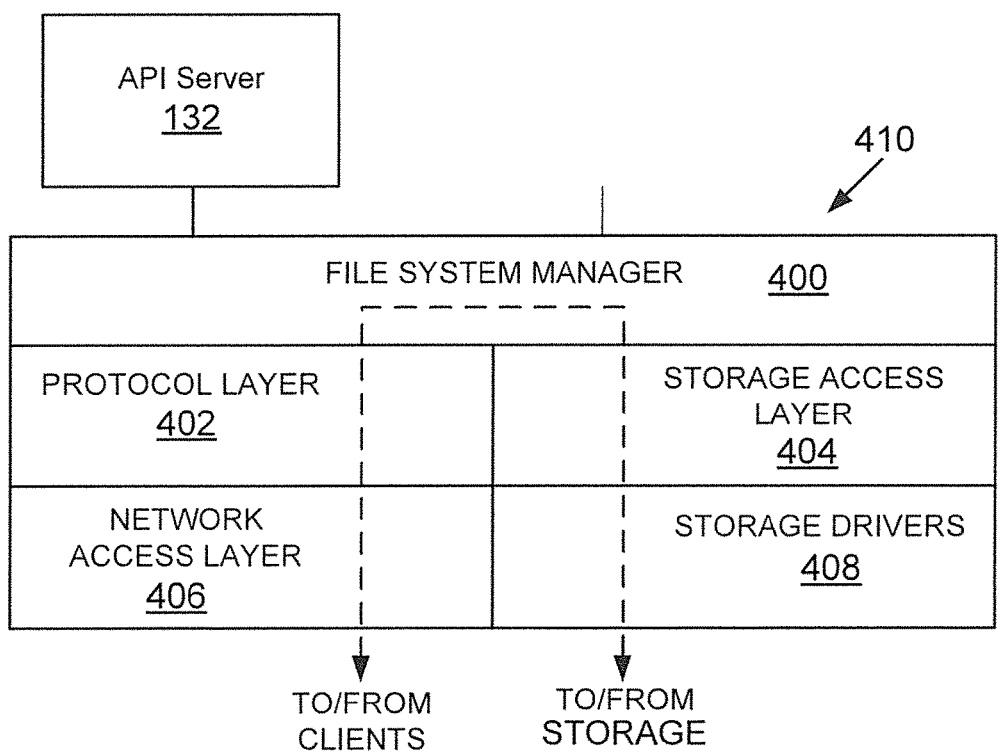
FIG. 4A shows an example of a storage operating system, used according to one aspect of the present disclosure.

Operating System: FIG. 4 illustrates a generic example of storage operating system 410 (or 134, FIG. 1A) executed by node 208.1, according to one aspect of the present disclosure. The storage operating system 410 interfaces with API server 132 (including adapter 160) and the monitoring console 128 for monitoring resources and providing performance and capacity information, as described above.

In one example, storage operating system 410 may include several modules, or "layers" executed by one or both of network module 214 and storage module 216. These layers include a file system manager 400 that keeps track of a directory structure (hierarchy) of the data stored in storage devices and manages read/write operation, i.e. executes read/write operation on storage in response to client 204.1/204.N requests.

Storage operating system 410 may also include a protocol layer 402 and an associated network access layer 406, to allow node 208.1 to communicate over a network with other systems, such as clients 204.1/204.N. Protocol layer 402 may implement one or more of various higher-level network protocols, such as NFS, CIFS, Hypertext Transfer Protocol (HTTP), TCP/IP and others.

Network access layer 406 may include one or more drivers, which implement one or more lower-level protocols to communicate over the network, such as Ethernet. Interactions between clients' and mass storage devices 212.1-212.3 (or 114) are illustrated schematically as a path, which illustrates the flow of data through storage operating system 410.

The storage operating system 410 may also include a storage access layer 404 and an associated storage driver layer 408 to allow storage module 216 to communicate with a storage device. The storage access layer 404 may implement a higher-level storage protocol, such as RAID (redundant array of inexpensive disks), while the storage driver layer 408 may implement a lower-level storage device access protocol, such as FC or SCSI. The storage driver layer 408 may maintain various data structures (not shown) for storing information regarding storage volume, aggregate and various storage devices that is provided to adapter 160, when requested.

As used herein, the term "storage operating system" generally refers to the computer-executable code operable on a computer to perform a storage function that manages data access and may, in the case of a node 208.1, implement data access semantics of a general purpose operating system. The storage operating system can also be implemented as a microkernel, an application program operating over a general-purpose operating system, such as UNIX® or Windows XP®, or as a general-purpose operating system with configurable functionality, which is configured for storage applications as described herein.

In addition, it will be understood to those skilled in the art that the disclosure described herein may apply to any type of special-purpose (e.g., file server, filer or storage serving appliance) or general-purpose computer, including a standalone computer or portion thereof, embodied as or including a storage system. Moreover, the teachings of this disclosure can be adapted to a variety of storage system architectures including, but not limited to, a network-attached storage environment, a storage area network and a storage device directly-attached to a client or host computer. The term "storage system" should therefore be taken broadly to include such arrangements in addition to any subsystems configured to perform a storage function and associated with other equipment or systems. It should be noted that while this description is written in terms of a write any where file system, the teachings of the present disclosure may be utilized with any suitable file system, including a write in place file system.

Figure 4B:
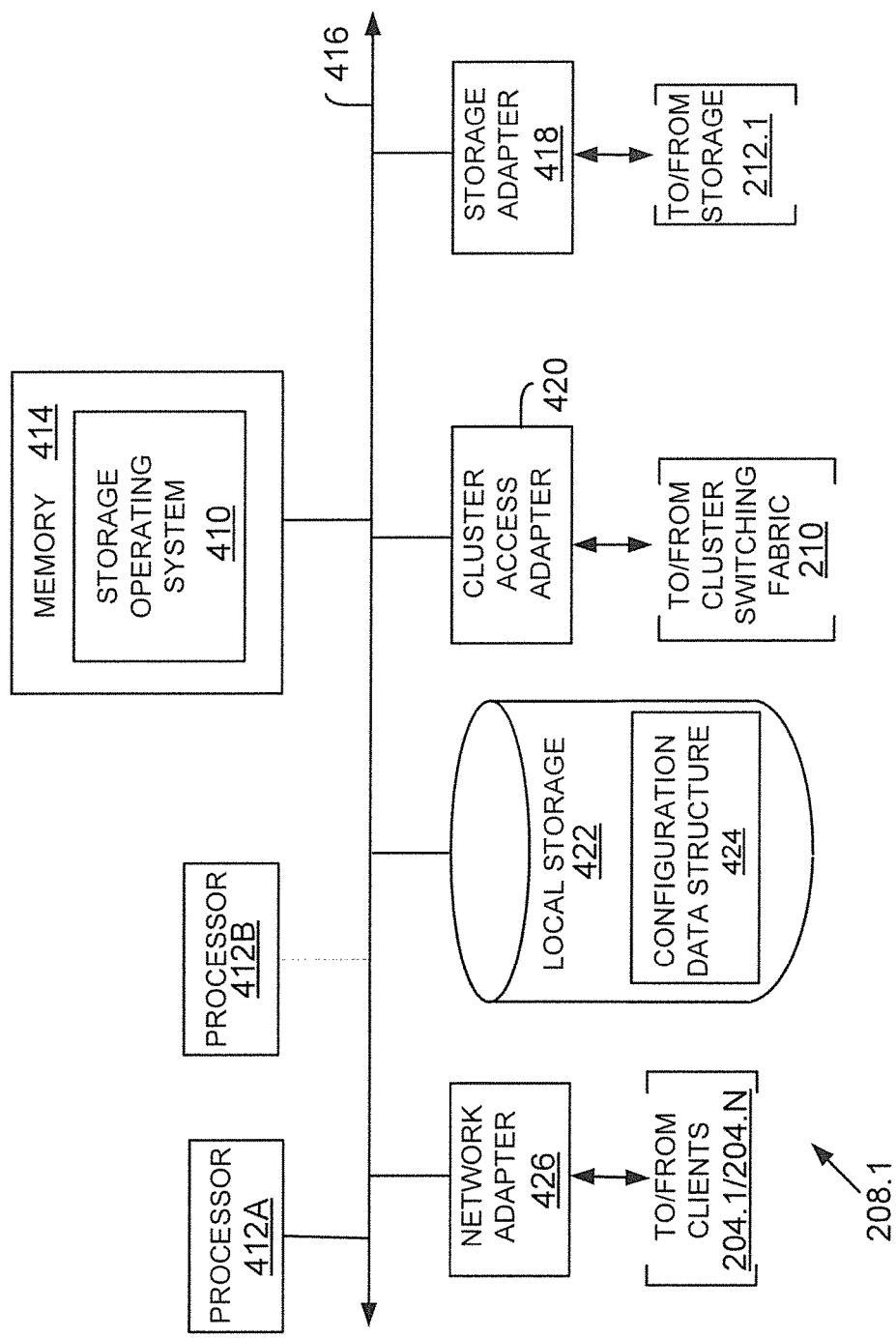
FIG. 4B shows an example of a storage system node, according to one aspect of the present disclosure.

Storage System Node: FIG. 4B is a block diagram of a node 208.1 that is illustratively embodied as a storage system comprising of a plurality of processors 412A and 412B, a memory 414, a network adapter 426, a cluster access adapter 420, a storage adapter 418 and local storage 422 interconnected by a system bus 416. Node 208.1 may be used to provide QOS information to API server 132 and/or monitoring console 128 described above.

Processors 412A-412B may be, or may include, one or more programmable general-purpose or special-purpose microprocessors, digital signal processors (DSPs), programmable controllers, application specific integrated circuits (ASICs), programmable logic devices (PLDs), or the like, or a combination of such hardware devices. The local storage 422 comprises one or more storage devices utilized by the node to locally store configuration information for example, in a configuration data structure 424. The configuration information may include policy level information regarding storage volumes and their associated latency and throughput rates.

The cluster access adapter 420 comprises a plurality of ports adapted to couple node 208.1 to other nodes of cluster 100. In the illustrative aspect, Ethernet may be used as the clustering protocol and interconnect media, although it will be apparent to those skilled in the art that other types of protocols and interconnects may be utilized within the cluster architecture described herein. In alternate aspects where the network modules and Storage modules are implemented on separate storage systems or computers, the cluster access adapter 420 is utilized by the network/storage module for communicating with other network/storage modules in the cluster 100.

Each node 208.1 is illustratively embodied as a dual processor storage system executing a storage operating system 410 (similar to 134, FIG. 1A) that preferably implements a high-level module, such as a file system, to logically organize the information as a hierarchical structure of named directories and files on storage 212.1. However, it will be apparent to those of ordinary skill in the art that the node 208.1 may alternatively comprise a single or more than two processor systems. Illustratively, one processor 412A executes the functions of the network module 214 on the node, while the other processor 412B executes the functions of the storage module 216.

The memory 414 illustratively comprises storage locations that are addressable by the processors and adapters for storing programmable instructions and data structures. The processor and adapters may, in turn, comprise processing elements and/or logic circuitry configured to execute the programmable instructions and manipulate the data structures. It will be apparent to those skilled in the art that other processing and memory means, including various computer readable media, may be used for storing and executing program instructions pertaining to the disclosure described herein.

The storage operating system 410 portions of which is typically resident in memory and executed by the processing elements, functionally organizes the node 208.1 by, inter alia, invoking storage operation in support of the storage service implemented by the node.

The network adapter 426 comprises a plurality of ports adapted to couple the node 208.1 to one or more clients 204.1/204.N over point-to-point links, wide area networks, virtual private networks implemented over a public network (Internet) or a shared local area network. The network adapter 426 thus may comprise the mechanical, electrical and signaling circuitry needed to connect the node to the network. Illustratively, the computer network 206 may be embodied as an Ethernet network or a Fibre Channel network. Each client 204.1/204.N may communicate with the node over network 206 by exchanging discrete frames or packets of data according to pre-defined protocols, such as TCP/IP.

The storage adapter 418 cooperates with the storage operating system 410 executing on the node 208.1 to access information requested by the clients. The information may be stored on any type of attached array of writable storage device media such as video tape, optical, DVD, magnetic tape, bubble memory, electronic random access memory, micro-electro mechanical and any other similar media adapted to store information, including data and parity information. However, as illustratively described herein, the information is preferably stored on storage device 212.1. The storage adapter 418 comprises a plurality of ports having input/output (I/O) interface circuitry that couples to the storage devices over an I/O interconnect arrangement, such as a conventional high-performance, FC link topology.

Figure 5:
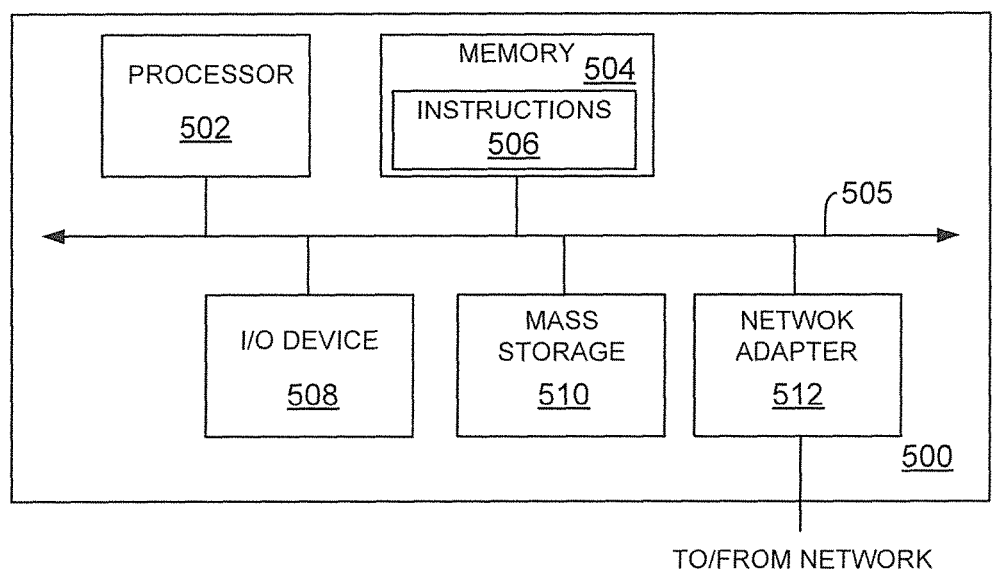
FIG. 5 shows an example of a processing system, used according to one aspect of the present disclosure.

Processing System: FIG. 5 is a high-level block diagram showing an example of the architecture of a processing system 500 that may be used according to one aspect. The processing system 500 can represent host system 102, API server 132, monitoring console 128, clients 116 or 204, or storage system 108. Note that certain standard and well-known components which are not germane to the present aspects are not shown in FIG. 5.

The processing system 500 includes one or more processor(s) 502 and memory 504, coupled to a bus system 505. The bus system 505 shown in FIG. 5 is an abstraction that represents any one or more separate physical buses and/or point-to-point connections, connected by appropriate bridges, adapters and/or controllers. The bus system 505, therefore, may include, for example, a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1394 bus (sometimes referred to as "Firewire").

The processor(s) 502 are the central processing units (CPUs) of the processing system 500 and, thus, control its overall operation. In certain aspects, the processors 502 accomplish this by executing software stored in memory 504. A processor 502 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

Memory 504 represents any form of random access memory (RAM), read-only memory (ROM), flash memory, or the like, or a combination of such devices. Memory 504 includes the main memory of the processing system 500. Instructions 506 may be used to implement the process steps of FIGS. 3B and 3C (and class diagrams of FIGS. 3D-3F described above) may reside in and execute (by processors 502) from memory 504.

Also connected to the processors 502 through the bus system 505 are one or more internal mass storage devices 510, and a network adapter 512. Internal mass storage devices 510 may be, or may include any conventional medium for storing large volumes of data in a non-volatile manner, such as one or more magnetic or optical based disks. The network adapter 512 provides the processing system 500 with the ability to communicate with remote devices (e.g., storage servers) over a network and may be, for example, an Ethernet adapter, a Fibre Channel adapter, or the like.

The processing system 500 also includes one or more input/output (I/O) devices 508 coupled to the bus system 505. The I/O devices 508 may include, for example, a display device, a keyboard, a mouse, etc.

Thus, a method and apparatus for monitoring storage resources in a networked storage environment have been described. Note that references throughout this specification to "one aspect" (or "embodiment") or "an aspect" mean that a particular feature, structure or characteristic described in connection with the aspect is included in at least one aspect of the present disclosure. Therefore, it is emphasized and should be appreciated that two or more references to "an aspect" or "one aspect" or "an alternative aspect" in various portions of this specification are not necessarily all referring to the same aspect. Furthermore, the particular features, structures or characteristics being referred to may be combined as suitable in one or more aspects of the disclosure, as will be recognized by those of ordinary skill in the art.

While the present disclosure is described above with respect to what is currently considered its preferred aspects, it is to be understood that the disclosure is not limited to that described above. To the contrary, the disclosure is intended to cover various modifications and equivalent arrangements within the spirit and scope of the appended claims.

What is claimed is:

1. A machine implemented method, comprising:

generating a resource model for representing a storage system platform type having a plurality of resources used in a networked storage system for storing and accessing data for a client computing device;

wherein each of the plurality of resources is represented by an object within the resource model in a same format, regardless of resource type; and wherein the resource model includes relationship objects, where each relationship object identifies related resources from among the plurality of resources and provides an indication of a relationship type from among a composition, association and aggregation relationship types;

registering the resource model and an adapter service for the storage system platform type with an application programming interface (API) server, the adapter service interfacing with the plurality of resources of the networked storage system for retrieving information based on one or more monitoring objects maintained by the resource model, where each monitoring object identifies a monitored resource from among the plurality of resources and includes a metric associated with the monitored resource indicating a monitored attribute of the monitored resource;

maintaining by the API server a plurality of event objects for tracking events associated with one or more of the plurality of resources, the plurality of event objects defining an event type and event severity in a same format regardless of resource type and event type;

executing a data source service by the API server for obtaining information regarding any of the plurality of resources of the networked storage system, wherein the data source service uses a data source model to obtain information from different data sources associated with different storage system platform types; wherein the data source model uses a plurality of objects to retrieve information from the different data sources including a data source type object identifying a data source type, a data source adapter object identifying a specific adapter service for a specific data source, and a service type object identifying a service provided by the specific data source;

monitoring the plurality of resources by the API server using the resource model, the plurality of monitoring objects and the plurality of event objects; and based on an event type, taking an action involving an affected resource of the networked storage system.

2. The method of claim 1, wherein regardless of storage system platform type, the API server executes an event service for managing any event associated with any of the resources using one or more of the plurality of event objects.

3. The method of claim 1, wherein the API server executes a metric service for obtaining information regarding any metric indicated by the one or more monitoring objects for the plurality of resources.

4. The method of claim 1, wherein the API server executes an inventory service that consolidates information regarding the plurality of resources and provides the consolidated information, in response to a request.

5. The method of claim 1, wherein the plurality of resources include an aggregate, storage volume and a storage virtual machine.

6. The method of claim 1, wherein the API server executes a dedicated adapter service for each data source type for collecting resource information from each data source type.

7. The method of claim 6, wherein the API server maintains a configuration data structure used for selecting the dedicated adapter service for a specific storage system platform type.

8. A non-transitory, machine readable medium having stored thereon instructions comprising machine executable code which when executed by a machine, causes the machine to:

generate a resource model for representing a storage system platform type having a plurality of resources used in a networked storage system for storing and accessing data for a client computing device;

wherein each of the plurality of resources is represented by an object within the resource model in a same format, regardless of resource type; and wherein the resource model includes relationship objects, where each relationship object identifies related resources from among the plurality of resources and provides an indication of a relationship type from among a composition, association and aggregation relationship types;

register the resource model and an adapter service for the storage system platform type with an application programming interface (API) server, the adapter service interfacing with the plurality of resources of the networked storage system for retrieving information based on one or more monitoring objects maintained by the resource model, where each monitoring object identifies a monitored resource from among the plurality of resources and includes a metric associated with the monitored resource indicating a monitored attribute of the monitored resource;

maintain by the API server a plurality of event objects for tracking events associated with one or more of the plurality of resources, the plurality of event objects defining an event type and event severity in a same format regardless of resource type and event type;

execute a data source service by the API server for obtaining information regarding any of the plurality of resources of the networked storage system, wherein the data source service uses a data source model to obtain information from different data sources associated with different storage system platform types; wherein the data source model uses a plurality of objects to retrieve information from the different data sources including a data source type object identifying a data source type, a data source adapter object identifying a specific adapter service for a specific data source, and a service type object identifying a service provided by the specific data source;

monitor the plurality of resources by the API server using the resource model, the plurality of monitoring objects and the plurality of event objects; and based on an event type, taking an action involving an affected resource of the networked storage system.

9. The non-transitory, storage medium of claim 8, wherein regardless of storage system platform type, the API server executes an event service for managing any event associated with any of the resources using one or more of the plurality of event objects.

10. The non-transitory, storage medium of claim 8, wherein the API server executes a metric service for obtaining information regarding any metric indicated by the one or more monitoring objects for the plurality of resources.

11. The non-transitory, storage medium of claim 8, wherein the API server executes an inventory service that consolidates information regarding the plurality of resources and provides the consolidated information, in response to a request.

12. The non-transitory, storage medium of claim 8, wherein the plurality of resources include an aggregate, storage volume and a storage virtual machine.

13. The non-transitory, storage medium of claim 8, wherein the API server executes a dedicated adapter service for each data source type for collecting resource information from each data source type.

14. The non-transitory, storage medium of claim 13, wherein the API server maintains a configuration data structure used for selecting the dedicated adapter service for a specific storage system platform type wherein the API server maintains a configuration data structure used for selecting an adapter service for a specific storage system platform type.

15. A system, comprising:

a memory containing machine readable medium comprising machine executable code having stored thereon instructions; and a processor module for an application programming interface (API) server coupled to the memory, the processor module configured to execute the machine executable code to:

generate a resource model for representing a storage system platform type having a plurality of resources used in a networked storage system for storing and accessing data for a client computing device;

wherein each of the plurality of resources is represented by an object within the resource model in a same format, regardless of resource type; and wherein the resource model includes relationship objects, where each relationship object identifies related resources from among the plurality of resources and provides an indication of a relationship type from among a composition, association and aggregation relationship types;

register the resource model and an adapter service for the storage system platform type, the adapter service interfacing with the plurality of resources of the networked storage system for retrieving information based on one or more monitoring objects maintained by the resource model, where each monitoring object identifies a monitored resource from among the plurality of resources and includes a metric associated with the monitored resource indicating a monitored attribute of the monitored resource;

maintain a plurality of event objects for tracking events associated with one or more of the plurality of resources, the plurality of event objects defining an event type and event severity in a same format regardless of resource type and event type;

execute a data source service for obtaining information regarding any of the plurality of resources of the networked storage system, wherein the data source service uses a data source model to obtain information from different data sources associated with different storage system platform types; wherein the data source model uses a plurality of objects to retrieve information from the different data sources including a data source type object identifying a data source type, a data source adapter object identifying a specific adapter service for a specific data source, and a service type object identifying a service provided by the specific data source;

monitor the plurality of resources using the resource model, the plurality of monitoring objects and the plurality of event objects; and based on an event type, taking an action involving an affected resource of the networked storage system.

16. The system of claim 15, wherein regardless of storage system platform type, the API server executes an event service for managing any event associated with any of the resources using one or more of the plurality of event objects.

17. The system of claim 15, wherein the API server executes a metric service for obtaining information regarding any metric indicated by the one or more monitoring objects for the plurality of resources.

18. The system of claim 15, wherein the API server executes an inventory service that consolidates information regarding the plurality of resources and provides the consolidated information, in response to a request.

19. The system of claim 15, wherein the plurality of resources include an aggregate, storage volume and a storage virtual machine.

20. The system of claim 15, wherein the API server executes a dedicated adapter service for each data source type for collecting resource information from each data source type.

21. The system of 20, wherein the API server maintains a configuration data structure used for selecting the dedicated adapter service for a specific storage system platform type.

* * * * *